Nov. 24, 1925.

C. J. MUEND 1,562,982

NOZZLE CONNECTION

Filed April 22, 1925

Inventor:
Charles J. Muend,
By
Attorney.

Patented Nov. 24, 1925.

1,562,982

UNITED STATES PATENT OFFICE.

CHARLES J. MUEND, OF PHILADELPHIA, PENNSYLVANIA, ASSIGNOR TO HAINES, JONES & CADBURY INCORPORATED, A CORPORATION OF PENNSYLVANIA.

NOZZLE CONNECTION.

Application filed April 22, 1925. Serial No. 24,959.

*To all whom it may concern:*

Be it known that I, CHARLES J. MUEND, a citizen of the United States, residing at Philadelphia, in the county of Philadelphia, State of Pennsylvania, have invented a new and useful Nozzle Connection, of which the following is a specification.

My invention relates to improvments in nozzle connection. The object is to provide improved means whereby a nozzle or spout may be attached to a connecting pipe or supply by threaded engagement, with its base against a flat surface and its discharge end properly directed. The invention is especially adapted for connecting nozzles of china or similar material upon which only limited pressures may be safely applied, that is, without danger of breaking.

Referring to the drawings, which illustrate, merely by way of example, a suitable embodiment of the invention:

Similar numerals refer to similar parts throughout the several views.

Figure 1:
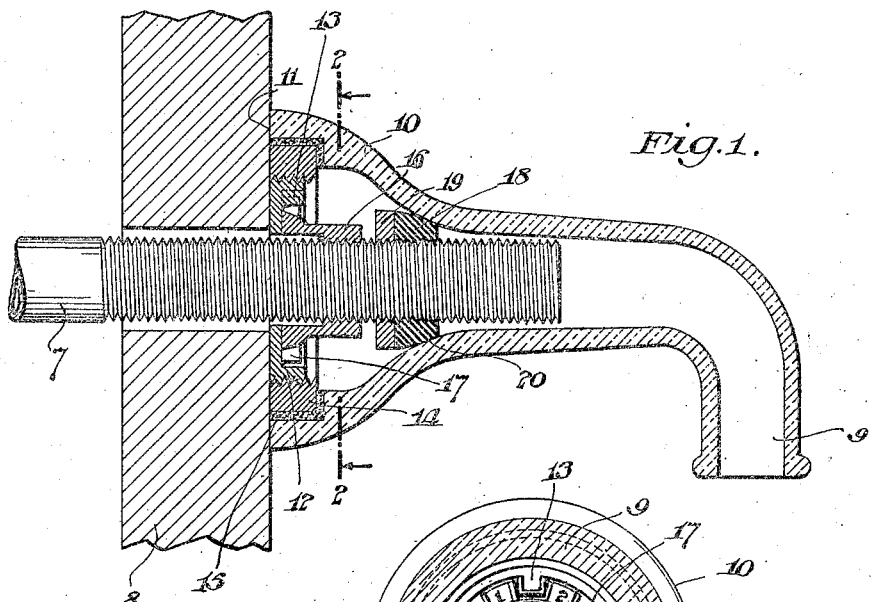
Fig. 1 is a longitudinal vertical section.
Figure 2:
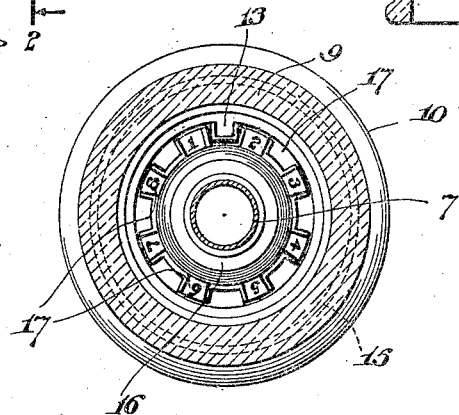
Fig. 2 is a cross section on line 2, 2 of Fig. 1.
Figure 3:
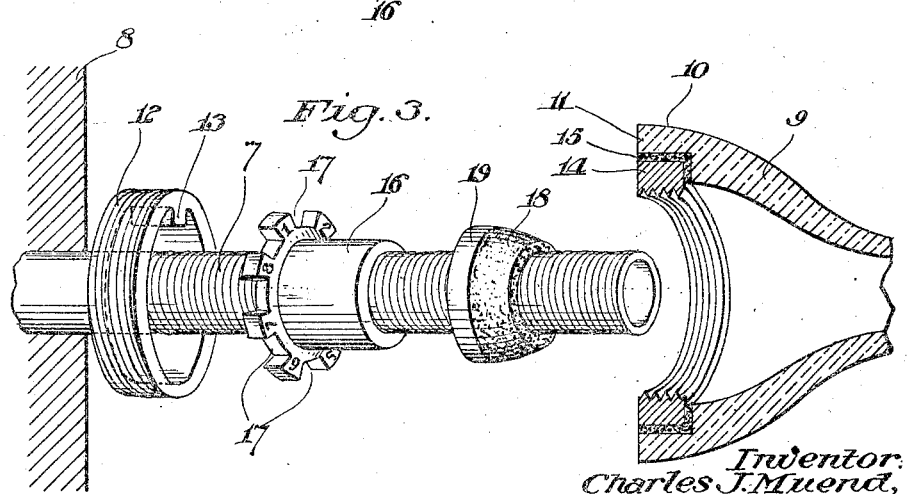
Fig. 3 is a fragmentary view partly in perspective and partly in section, with the elements separated.

In the example shown, the invention is shown in connection with a china nozzle adapted to project from the wall, over the rim of a bath tub.

The supply pipe 7 extends from a suitable fixture, not shown, through the wall 8, and is threaded from a point back of the wall surface to its extreme outer end. Upon this pipe 7 the china nozzle 9 is fitted in the following manner.

The nozzle 9 is shown with an enlarged base 10, having a flat annular surface at 11 adapted to fit snugly against the surface of the wall 8. The nozzle is held upon the pipe 7 by means of a collar 12, having a peripheral thread, but a smooth central bore so as to fit loosely over pipe 7. This collar 12 is also provided with an interiorly projecting lug 13. An interiorly threaded collar 14 is secured in an annular channel 15 within the base 10 of nozzle 9. The thread of this collar 14 meshes with the exterior or peripheral thread of collar 12. Collar 12 is held clamped against wall 8 by means of the clamping member 16, threaded onto pipe 7, and provided with the peripheral notches 17, any one of which is adapted to receive the lug 13 of collar 12.

A gasket or washer 18 is secured on the pipe 7 and is held in position of adjustment by the ring 19, threaded on pipe 7. This gasket 17 is adapted to engage, with substantial pressure, the inner tapered part (as at 20) of the throat of nozzle 9, to maintain a water-tight relation between nozzle 9 and pipe 7.

Now the chief feature of the invention is to secure such threaded relationship between threaded element or collar 12 and threaded elements or ring 14 of nozzle 9, that the annular surface 11 and the inner face of collar 12 will both engage the wall 8 with sufficient pressure while the delivery end 21 of nozzle 9 is pointed in the required direction, for example, downwardly to deliver to the tub.

It will be understood that the rotative position of the nozzle 9, when the face 11 is tight against the surface of wall 8 will depend upon the point of lead between the threads of elements 14 and 12. This point of lead will depend upon the rotative position of collar 12 when the same is pressed against the wall 8, by the action of the clamping member 16 which is threaded on pipe 7. It will be noted that members 12 and 16 are adapted to be locked together, against independent rotative movement, by the engagement of lug 13 in one of the recesses 17. If, when the collar 12 and nozzle member 9 are both against the wall 8, the discharge end 21 of nozzle 9 is not properly directed downwardly, it is only necessary to disengage the elements 12 and 16, so that they may be rotated relatively to bring the lug 13 into engagement with another notch 17, in order to shift the point of lead of the threaded engagement between 12 and 14. For example, when member 12 and face 11 of nozzle member 9, are both tightly pressed or clamped against wall 8, and it is found that the nozzle end 21, is, say a quarter turn out of the perpendicular, it is only necessary to separate parts or elements 12 and 16 and cause a corresponding relative turn between said elements, before re-engaging them, in order to bring the nozzle end 21 into proper discharging position when the collar 12 and face 11 are brought into proper clamping engagement with the wall. The numbering of the spaces between the recesses 17, as indicated, facilitates this operation of adjustment.

This arrangement is particularly important in connection with china nozzles, where there is a limit to the amount of pressure or strain that can safely be exerted thereon.

What I claim is:—

1. The combination of a supply pipe, a nozzle member, a threaded element secured to the nozzle member, a cooperating threaded element surrounding the supply pipe, and means for securing said cooperating threaded element in required initial position of rotative adjustment with respect to the first mentioned threaded element.

2. The combination of a supply pipe, a supporting wall surrounding the supply pipe, a nozzle member cooperating with the supply pipe and having a base adapted to engage said wall, a threaded element secured to the nozzle member, a cooperating threaded element surrounding the pipe and adapted to engage said wall, and means for securing initial relative rotative adjustment of said threaded elements.

3. The combination of a supply pipe, a supporting wall surrounding the supply pipe, a nozzle member cooperating with the supply pipe and having a base adapted to engage said wall, a threaded element secured to the nozzle member, a cooperating threaded element surrounding the pipe and adapted to engage said wall, and means for securing initial relative rotative adjustment of said threaded elements, so that the nozzle member will be clamped to the wall with its discharge end properly directed.

4. In combination with a supporting wall, a threaded supply pipe, a cooperating nozzle member having a base adapted to be clamped against said wall, a threaded element secured to the nozzle member, a cooperating threaded element surrounding said pipe, and adapted also to engage said wall, a clamping element threaded on the pipe adapted to engage said cooperating threaded element to force the same against the wall, and means for securing initial relative rotating adjustment between said clamping element and said cooperating threaded element as and for the purpose described.

5. In combination with a supporting wall, a threaded supply pipe, a cooperating nozzle member having a base adapted to be clamped against said wall, a threaded ring secured to the nozzle member, a cooperating threaded element loosely mounted on the pipe, a clamping element for clamping said cooperating threaded element against said wall and means for securing desired initial relative rotative adjustment between said two last mentioned elements to secure the proper point of lead between the threads of the threaded ring and of the cooperating threaded element.

6. The combination of a supply pipe, a nozzle member, means within the throat of the nozzle member for securing water-tight connection with the pipe, a threaded element secured to the nozzle member, a cooperating threaded element surrounding the supply pipe, and means for securing said cooperating threaded element in required initial position of rotative adjustment with respect to the first mentioned threaded element.

7. The combination of a supply pipe, a nozzle member, resilient and adjustable means within the throat of the nozzle member for securing water-tight connection with the pipe, a threaded element secured to the nozzle member, a cooperating threaded element surrounding the supply pipe, and means for securing said co-operating threaded element in required initial position of rotative adjustment with respect to the first mentioned threaded element.

CHARLES J. MUEND.